United States Patent [19]
Plemons

[11] Patent Number: 5,932,132
[45] Date of Patent: Aug. 3, 1999

[54] STERILE CONNECTOR APPARATUS AND METHOD

[75] Inventor: Rex A. Plemons, Tucson, Ariz.

[73] Assignee: Engineering & Research Associates, Inc., Tucson, Ariz.

[21] Appl. No.: 08/974,591

[22] Filed: Nov. 19, 1997

[51] Int. Cl.⁶ .................................................. H05B 6/62
[52] U.S. Cl. ............................ 219/769; 137/1; 137/114; 604/416
[58] Field of Search ................................ 219/769; 137/1, 137/2, 313, 10, 114, 317, 382, 383; 604/416, 87, 88; 206/219

[56] References Cited

U.S. PATENT DOCUMENTS

| | | | |
|---|---|---|---|
| 4,013,860 | 3/1977 | Hosterman et al. | 219/10.81 |
| 4,022,256 | 5/1977 | Berkman et al. | 141/1 |
| 4,390,832 | 6/1983 | Taylor | 323/273 |
| 4,488,028 | 12/1984 | Acker et al. | 219/10.81 |
| 4,491,711 | 1/1985 | Acker | 219/10.81 |
| 4,496,819 | 1/1998 | Acker et al. | 219/10.81 |
| 4,539,793 | 9/1985 | Malek et al. | 53/469 |
| 5,345,070 | 9/1994 | Hlavinka et al. | 219/769 |
| 5,349,166 | 9/1994 | Taylor | 219/643 |
| 5,520,218 | 5/1996 | Hlavinka et al. | 138/89 |
| 5,543,604 | 8/1996 | Taylor | 219/643 |

*Primary Examiner*—John A. Jeffery
*Assistant Examiner*—Jeffrey Pwu
*Attorney, Agent, or Firm*—Cahill, Sutton & Thomas P.L.C.

[57] ABSTRACT

A pair of plastic containers are compressed intermediate a pair of jaws and RF energy is applied as a function of the change in impedance of the melting plastic between the jaws to sterilize with heat the plastic intermediate the pair of jaws and to form a sterile rupturable membrane encircled by a seal to permit fluid communication on demand between the containers upon rupture of the membrane. The use of RF energy to heat bipolar plastic material (dielectric material) both sterilizes the plastic material and welds the plastic material at a proper temperature to form the rupturable membrane without the use of any instrumentation indicative of temperature or other control parameters.

43 Claims, 16 Drawing Sheets

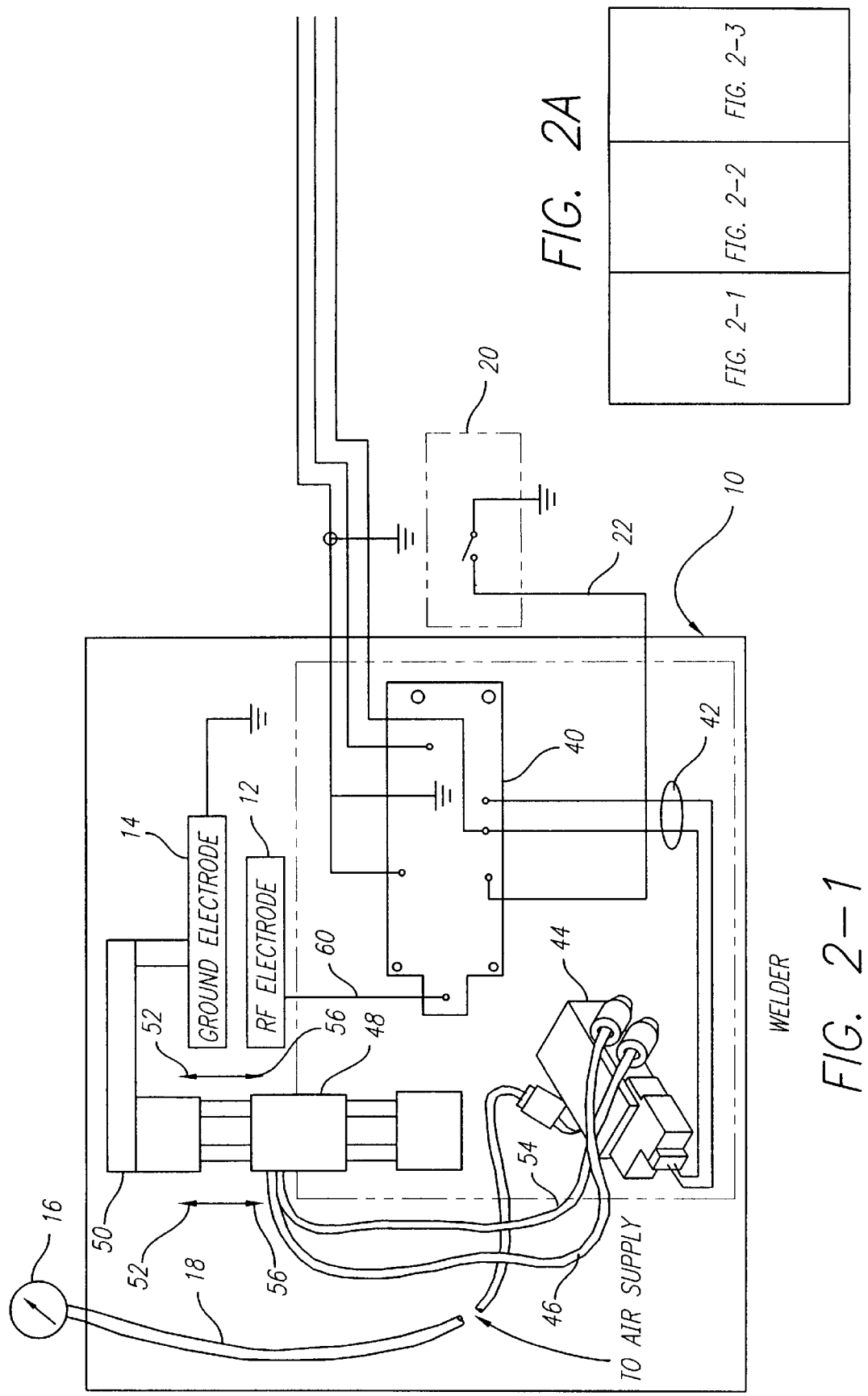

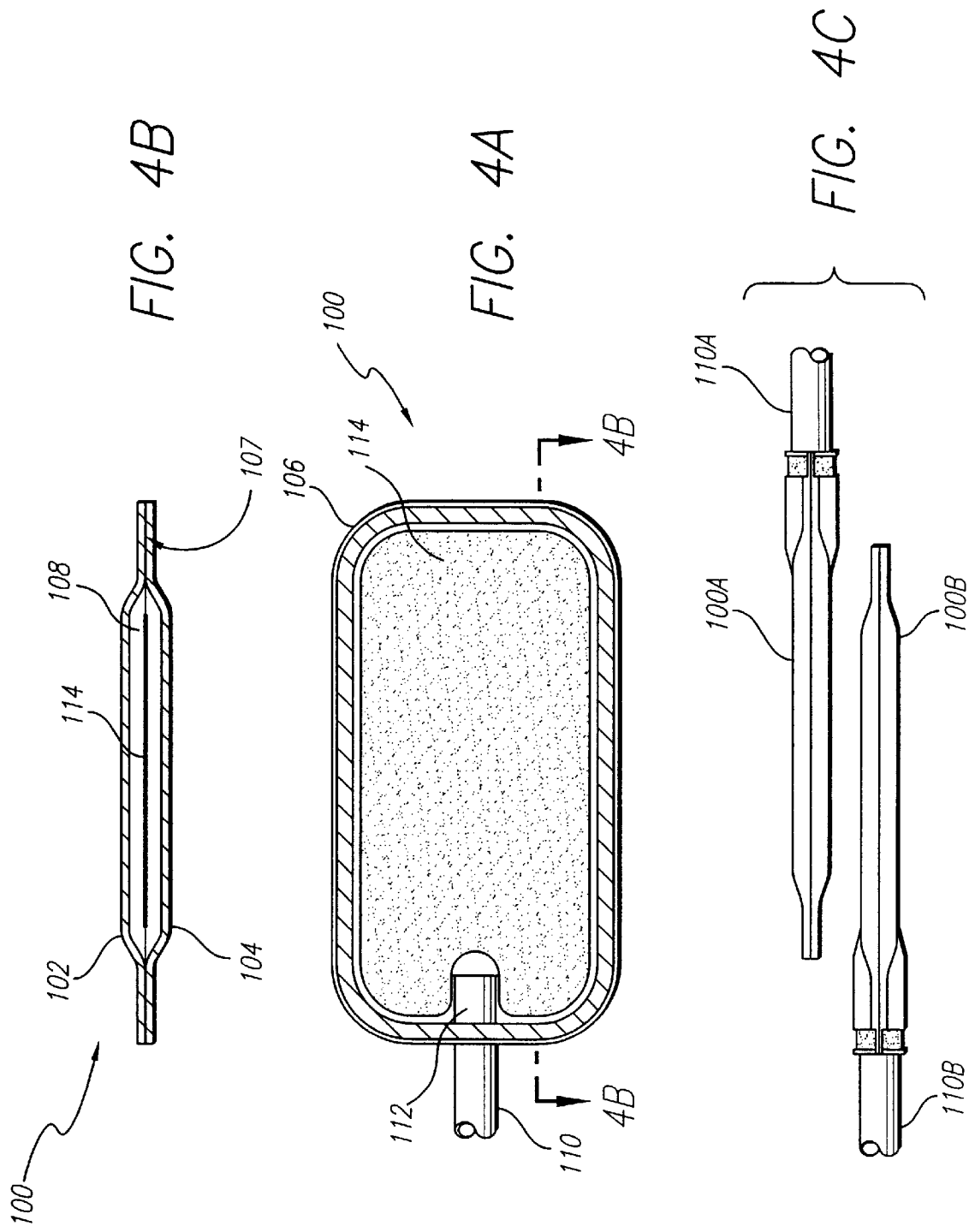

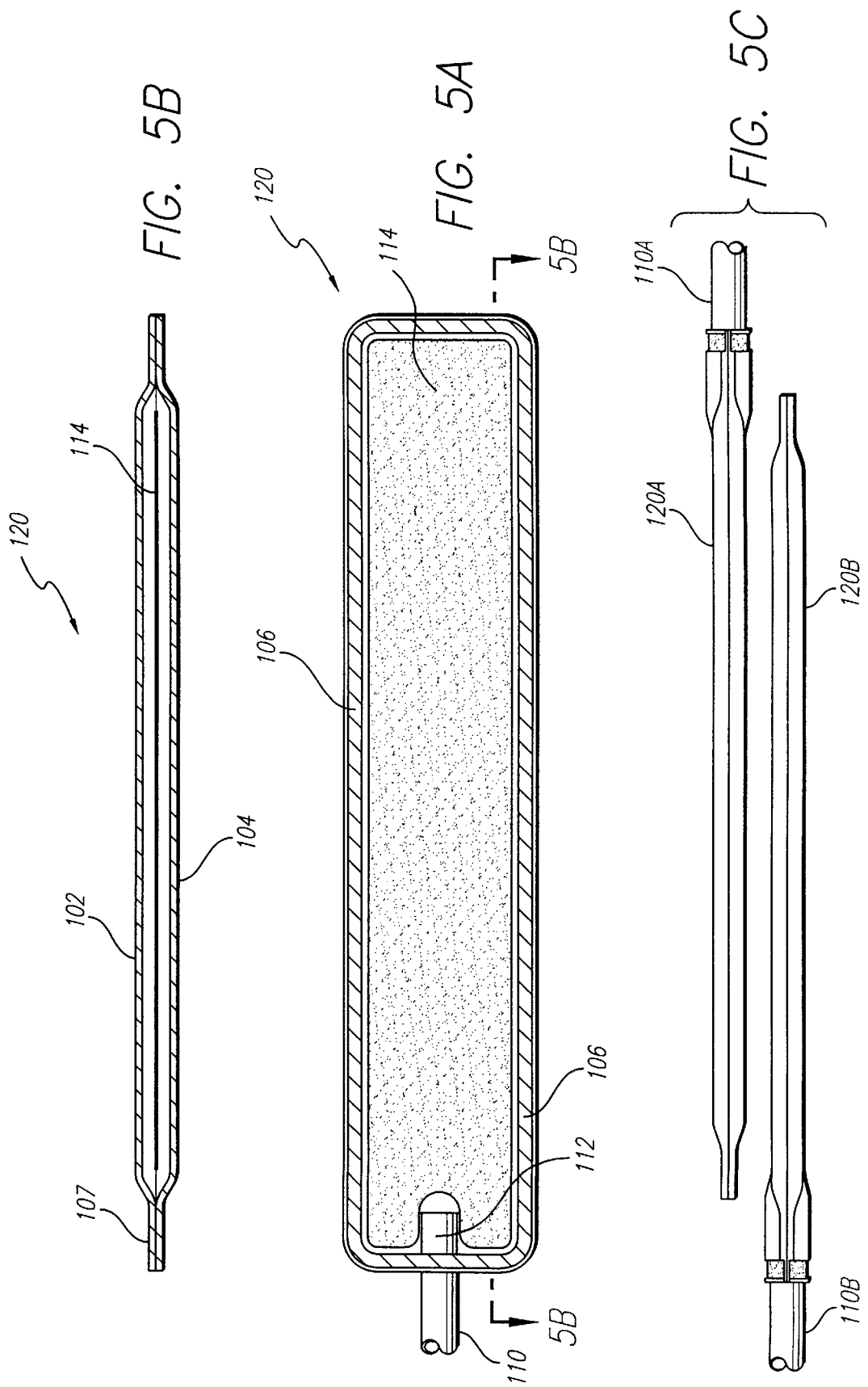

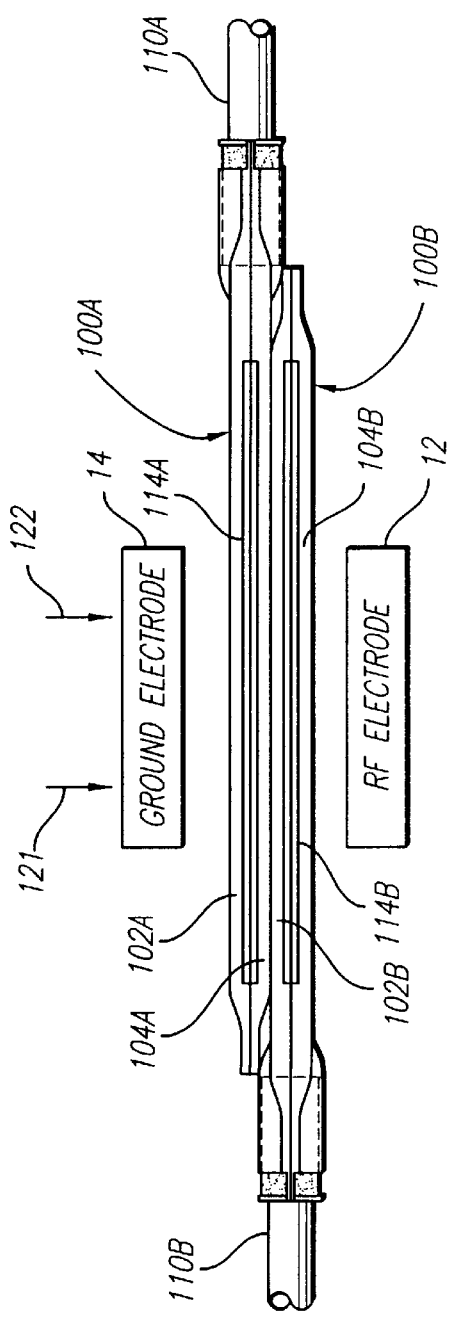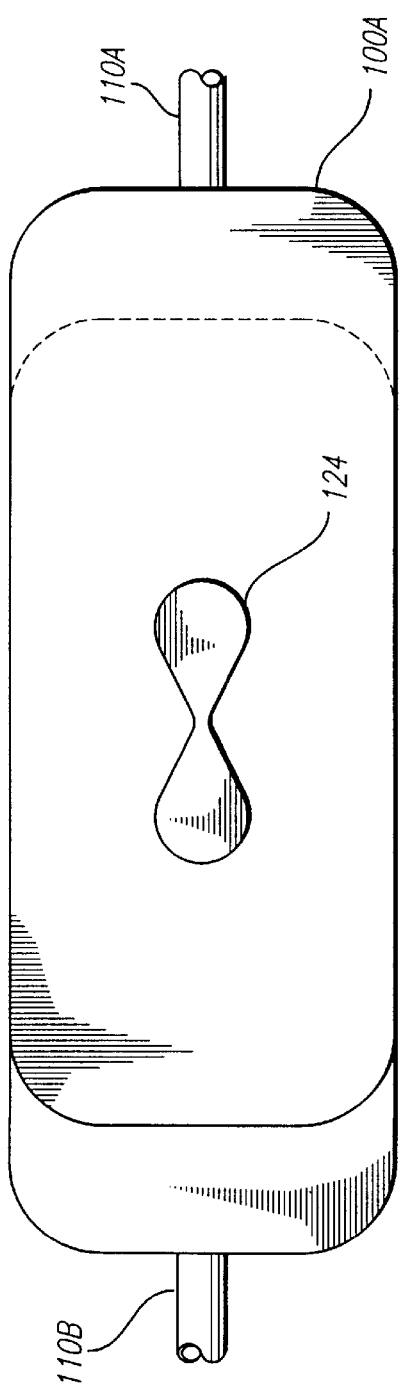

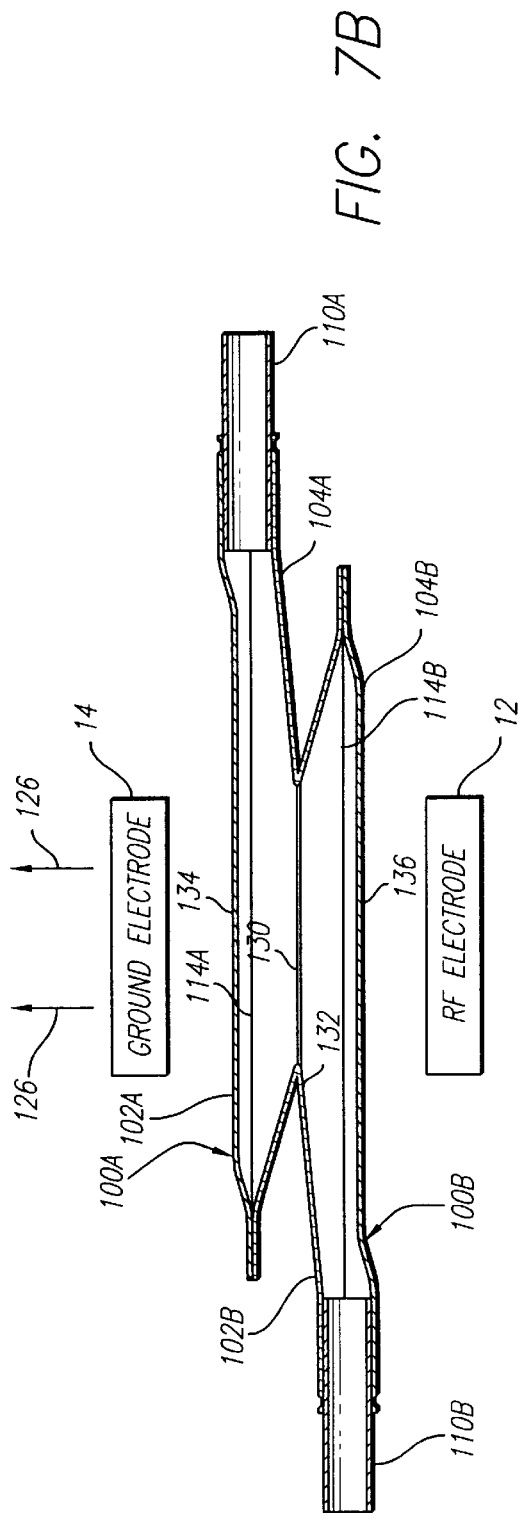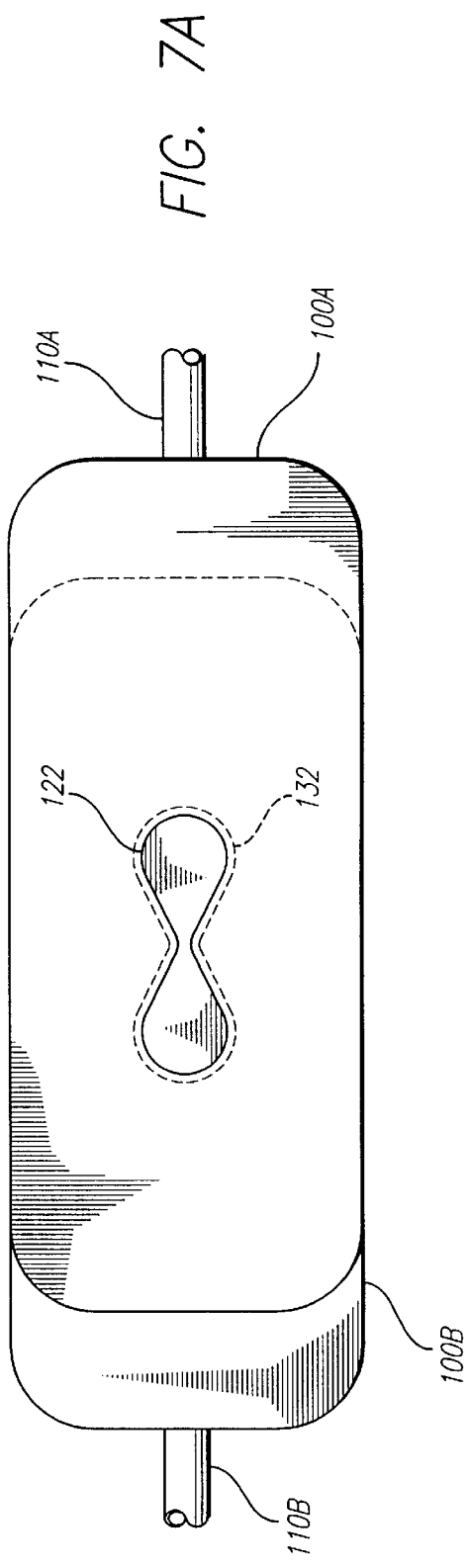

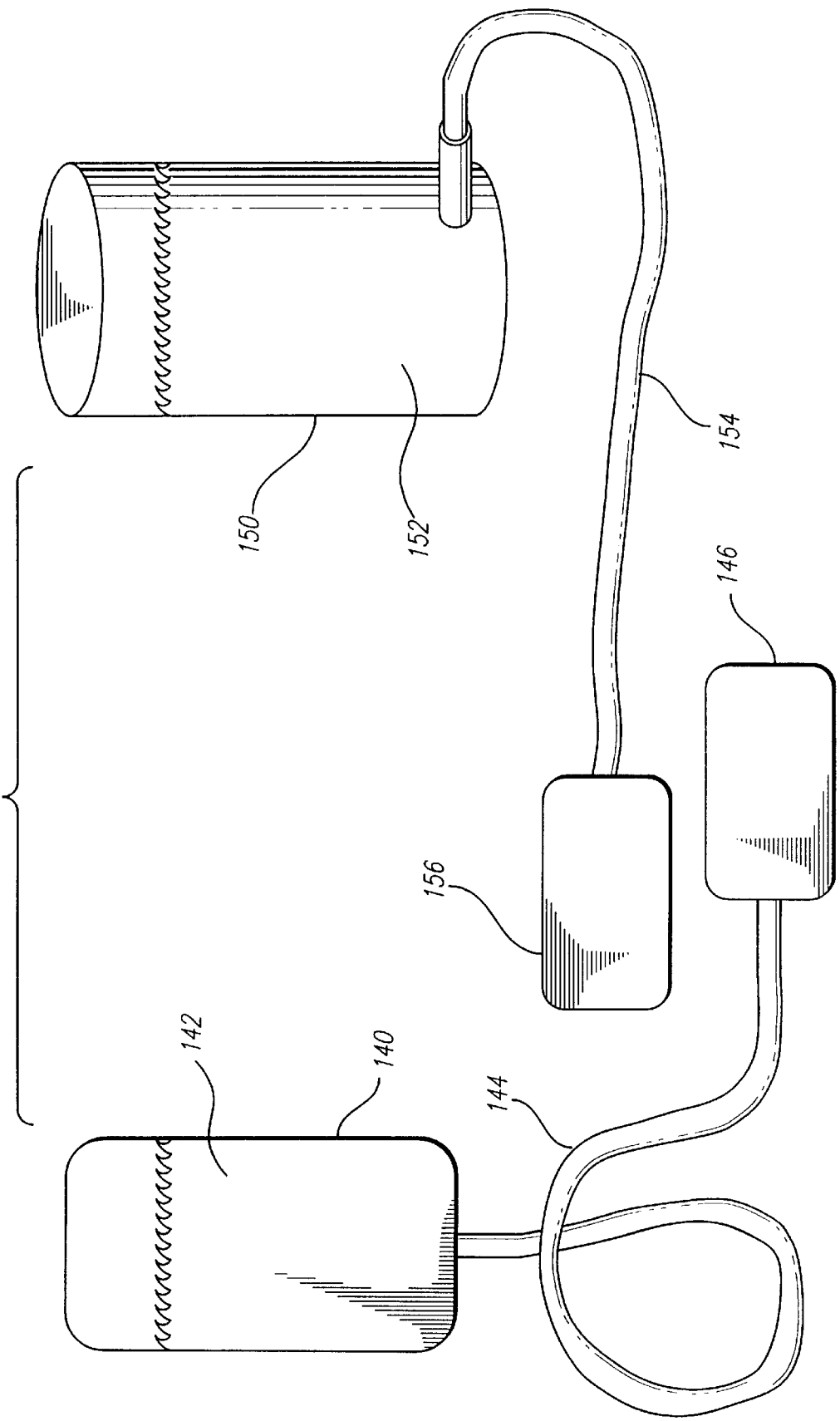

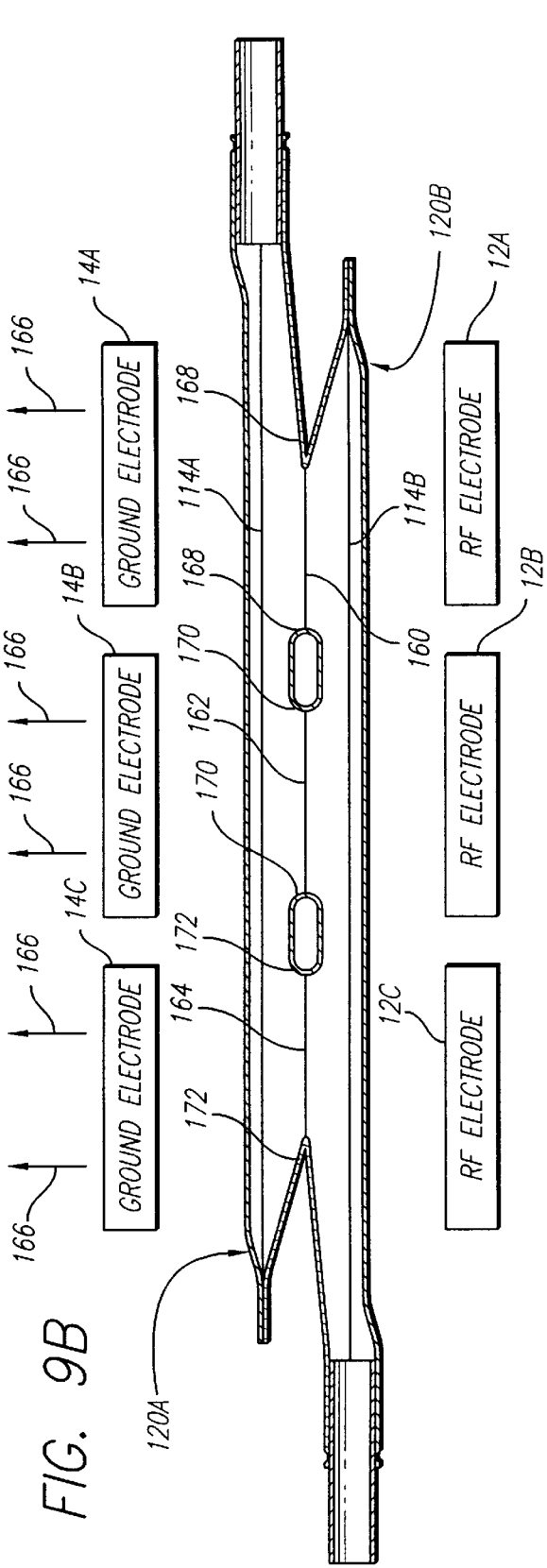
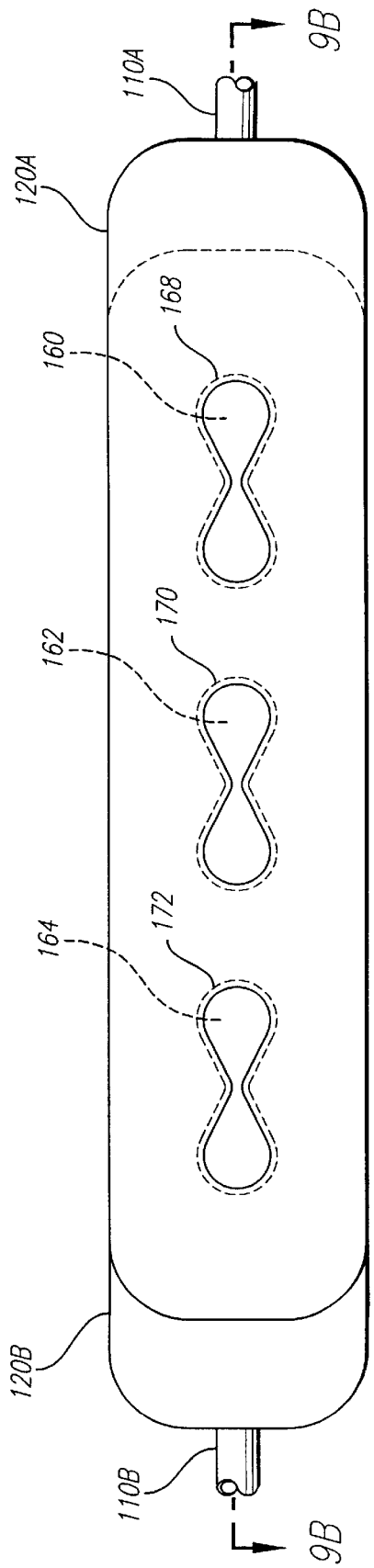

STERILE CONNECTOR APPARATUS AND METHOD

BACKGROUND OF THE INVENTION

1. Field of the Invention

The present invention relates to sterile connectors and, more particularly, to apparatus for sterilizing the interconnecting location of empty or filled plastic containers to permit sterile fluid communication therebetween.

2. Description of Related Art

The sterile transfer of fluids between two containers or from one container to another must be accomplished for various purposes in a variety of fields of endeavor to prevent contamination of the fluid(s). Of particular import is the medical field where the fluids are to be injected into living tissue. Other fields of importance includes the handling of fluids that could cause an environmental hazard or compromise the health/safety of personnel handling the fluid or compromise the biological quality of the fluid. Under many conditions, it is of importance to prevent fluid flow between two interconnected containers except on command and that initiation of such fluid flow be without compromise or danger to the environment nor to the sterile integrity of the flowing fluids. These same considerations are applicable attendant flow from a filled container to an empty container.

Apparatus striving to accomplish a sterile interconnection for flow between two fluid filled plastic containers is disclosed in U.S. Pat. No. 4,022,256. To accomplish flow between two lengths of tubing extending from respective fluid containing bags, the lengths of tubing are placed adjacent one another between a pair of jaws of a clamp. Each tubing includes an internally mounted liner which has a melt temperature greater than the temperature of the material forming the tubing. One of the pair of jaws includes a ridge oriented transverse to the tubing or a plurality of ridges formed in an H-pattern. The jaw containing the straight ridge or H-pattern ridges is heated electrically by a resistance heating element to a temperature in excess of the melt temperature of the tubing with the temperature of the jaw being controlled by integrated thermistors or thermocouples and a timer. The clamp squeezes the two lengths of tubing against one another while the heating jaw supporting the ridges heats the lengths of tubing to a temperature at or above melt temperature of the tubing. The ridge present on the heated jaw compresses the immediately adjacent section of plastic of each tubing. Such compression, in combination with the heating of the compressed tubing, melts the tubing and forces the plastic of the melting tubing to flow laterally and become evacuated from the area corresponding with the respective ridge(s). The evacuated plastic forms a seal about the evacuated area between the side walls of the respective lengths of tubing and adjacent the ridge; this results in an opening interconnecting the two lengths of tubing. The liner in each length of tubing prevents melting of the material of the tubings not adjacent one another. After the seal is formed, a coolant is introduced to the clamp to cool the heated jaw and brings about setting of the melted plastic. The heating of the tubing destroys any microorganisms on the surfaces of the lengths of tubing proximate the opening formed therebetween whereby the interconnection has become sterilized. As soon as the lengths of tubing are removed from the clamp, fluid communication therebetween exists through the opening formed and fluid flow between the attached containers will occur. U.S. Pat. No. 4,022,256 also discloses apparatus for forming a similar sterile opening between two fluid containing plastic packets.

SUMMARY OF THE INVENTION

An apparatus and a method are described for forming a sterile seal between two containers without the use of thermistors or thermocouples, timers or other instrumentation for controlling the amount and duration of heating or the degree of compressive force applied. The seal produces an internal membrane during formation which may be broken on command to permit fluid communication between the containers. A pair of mirror image jaws squeeze the containers toward one another in response to a predetermined mechanically applied force. Simultaneously, RF energy is transmitted across the jaws to heat the plastic material between the jaws. As such heating occurs, the plastic material will reach a natural melt/weld temperature as determined by the dipolar relationship of the plastic to the RF field. Thereupon, the plastic material will migrate laterally from between the jaws due to the compressive force applied by the jaws. Simultaneously, the RF energy in combination with the heat generated by the molten plastic will kill any microorganisms that may be present on the surfaces of the plastic material between the jaws. As the jaws translate toward one another, the impedance therebetween changes as a function of the quantity and the dielectric properties of the plastic material present. This change in impedance may or may not be sensed and controls the power of the RF energy transmitted and therefore controls the temperature and state of melt of the plastic and there is no need to sense these changes with other instrumentation. As the jaws come close to one another and the melting and sterility of the plastic material is achieved, the impedance sensed reaches a mismatch which will reduce the power of the RF energy transmitted. When the transmission of RF power is stopped, immediately thereafter the plastic will begin to cool and migration of plastic from between the jaws will cease. A thin wall barrier or membrane is left between the containers thereby preventing transfer of fluids between the containers. A liner or shield disposed in each container permits only the container walls adjacent one another to become fused with one another. By manipulating one or the other of the containers, the thin wall membrane formed therebetween can be ruptured to accommodate sterile fluid communication between the containers.

It is therefore a primary object of the present invention to provide apparatus and a method for aseptic interconnection for fluid flow between interconnected containers.

Another object of the present invention is to provide apparatus and a method for using RF energy to sterilize and weld plastic containers to one another to establish fluid flow therebetween without use of ancillary instrumentation to control and regulate the sterilization and welding processes.

Another object of the present invention is to provide a sterile interconnection which, on command, will establish fluid communication between two plastic containers.

Still another object of the present invention is to provide a sterile membrane between two containers that is rupturable on command to permit fluid communication therebetween.

Yet another object of the present invention is to sterilize with RF energy the surfaces of plastic containers to be interconnected with a sterile interconnection.

A further object of the present invention is to provide a rupturable sterile barrier between the interior of two plastic fluid containing devices.

A still further object of the present invention is to provide a shape for a thin walled barrier between two plastic containers that permits a predeterminable configuration of rupture of the barrier at will.

A yet further object of the present invention is to provide an hourglass shaped thin walled rupturable sterile membrane interconnecting the interior of two plastic containers.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIGS. 4A and 4B illustrate top and side cross-sectional views of a typical plastic bag;

FIG. 4C illustrates a typical set of bags prior to forming an interconnection therebetween;

FIGS. 5A and 5B illustrate top and side cross-sectional views of an elongated plastic bag;

FIG. 5C illustrates positioning of a pair of elongated plastic bags prior to forming the interconnection therebetween;

FIG. 6A illustrates compression of a pair of bags intermediate a pair of jaws (electrodes) and FIG. 6B illustrates a top view of the superimposed pair of bags;

FIG. 7A illustrates a top view of the pair of bags with the interconnection disposed therein and FIG. 7B illustrates a cross-section of the interconnection formed between a pair of bags;

FIG. 8 illustrates a typical application for interconnecting a pair of bags;

FIG. 9A illustrates a top view of the interconnections formed between the pair of elongated bags and FIG. 9B illustrates a cross-section of an elongated pair of bags wherein a plurality of interconnections have been formed;

DETAILED DESCRIPTION OF THE PREFERRED EMBODIMENT

Figure 1:
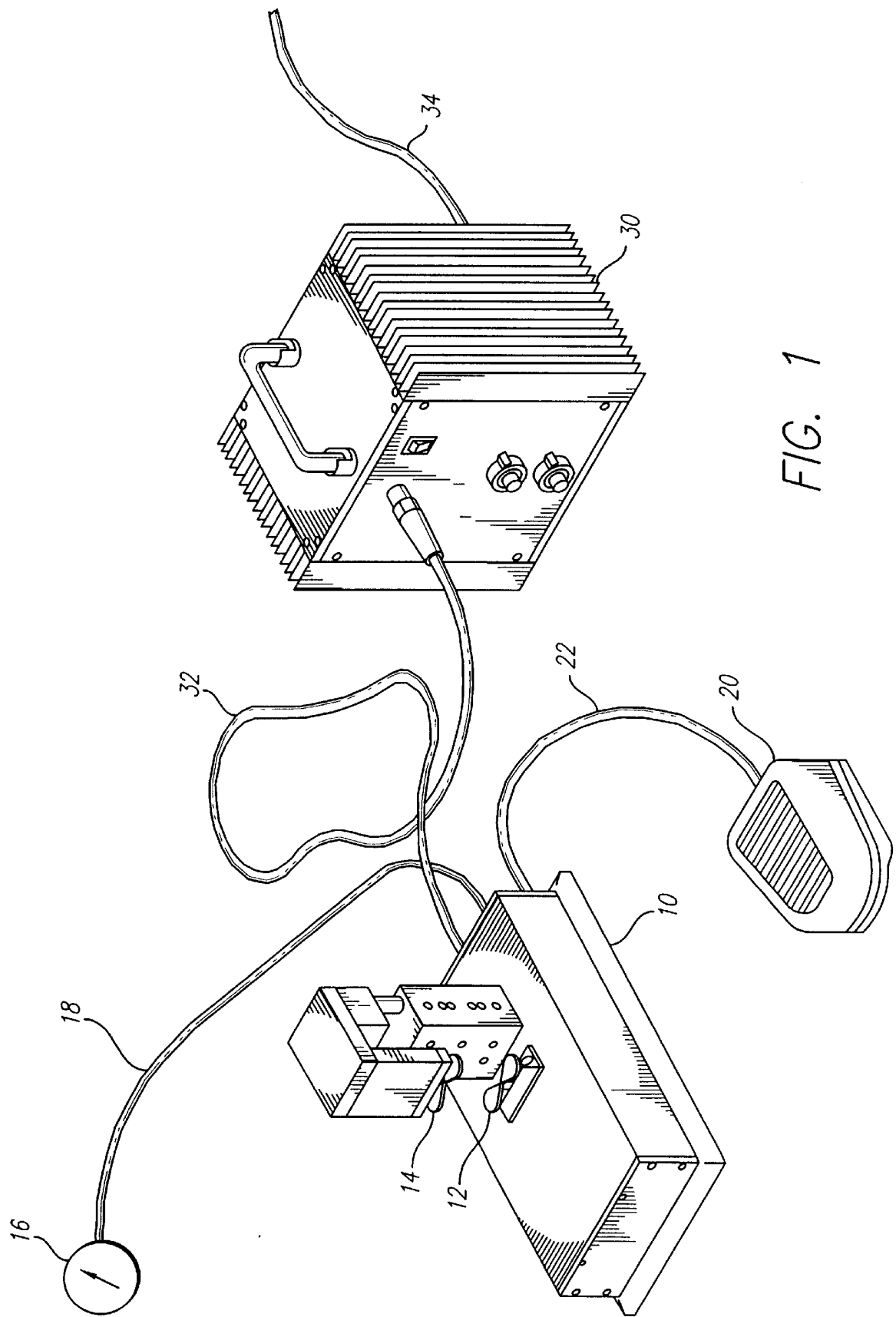
FIG. 1 illustrates the electric, pneumatic, and mechanical apparatus for forming a sterile interconnection between plastic containers.

The major components of the present invention are illustrated in FIG. 1. These components include a welding unit 10 supporting a pair of jaws depicted as fixed jaw 12 and movable jaw 14. The movable jaw is positionally responsive to application of air pressure, from an air pressure source depicted as air supply 16. The air supply is operatively connected to the respective pneumatic elements within welding unit 10 through a conduit 18. The application of air pressure to cause translation of movable jaw 14 is controlled by a control unit, depicted as foot switch 20. The foot switch is electrically connected to electrical circuitry within welding unit 10 by a conductor 22 to control operation of pneumatic control elements within the welding unit. RF generator 30 generates RF energy to be transmitted across jaws 12,14 to heat and to sterilize the tplastic elements clamped therebetween as a function of the electrical impedance between the clamping jaws. Upon activation of the RF generator by operation of foot switch 20, RF energy is transmitted to welding unit 10 via a coaxial cable 32, or the like. Power for the RF generator may be provided by internally or externally located batteries or by conventional alternating current, as depicted by power cord 34.

Figure 2:
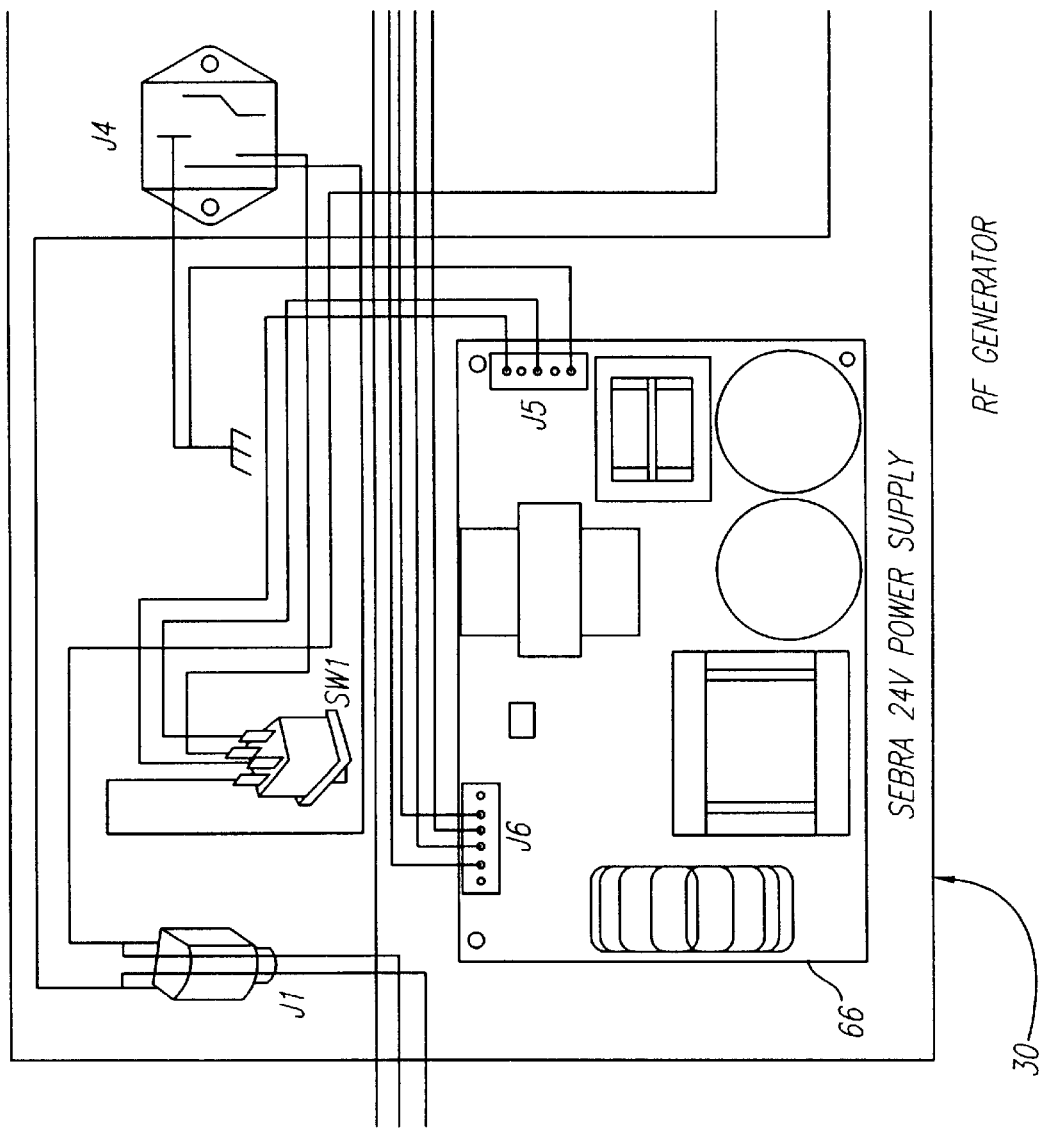
FIG. 2 illustrates a circuit for generating RF energy to heat the plastic and the application of such energy through the related pneumatically operated jaws.
Figures 2, 3:
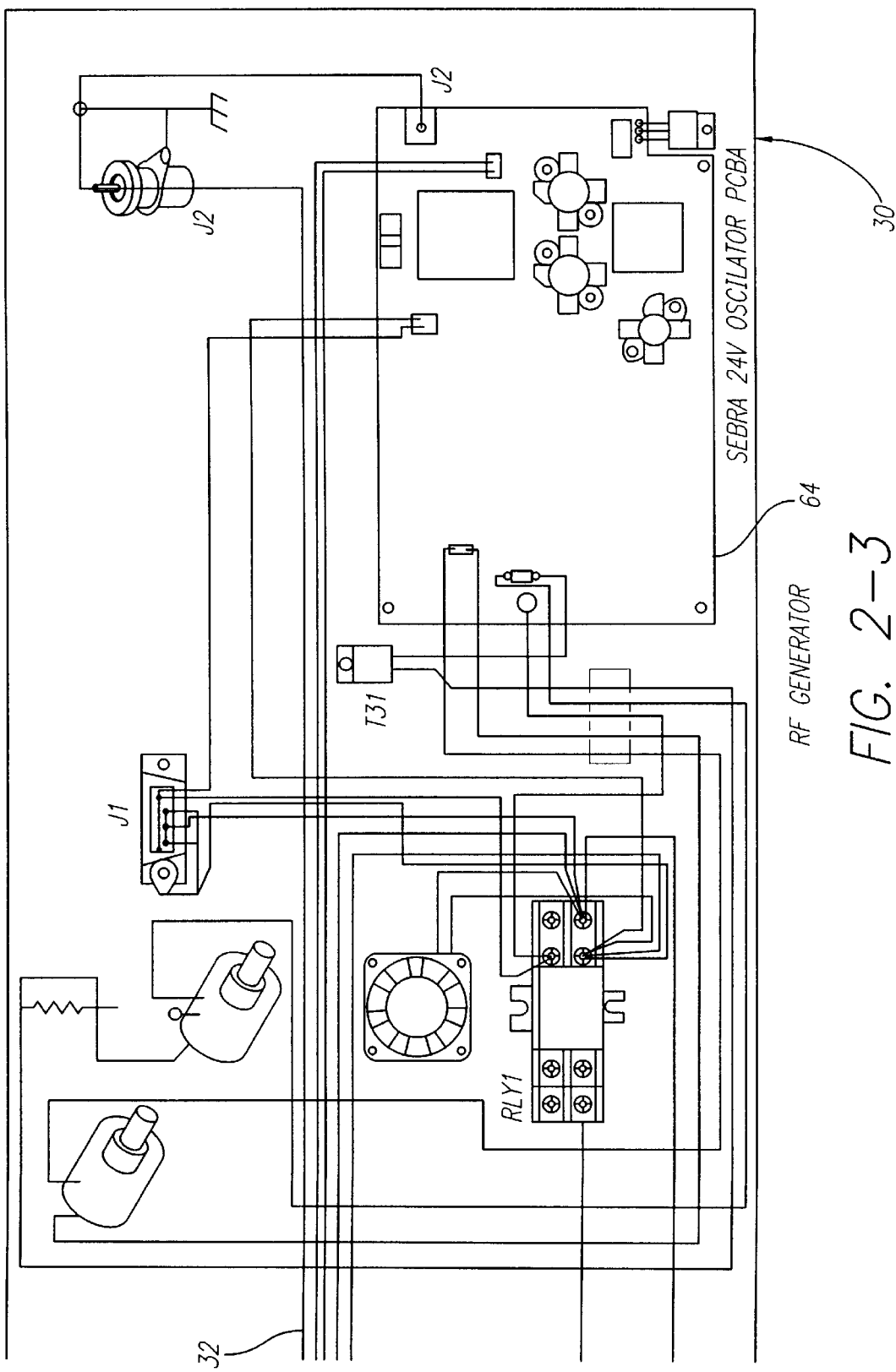

Further details of the components depicted in FIG. 1 will be described with reference to FIG. 2. Welding unit 10 includes a module 40 for producing various output signals in response to input signals received from RF generator 30 and foot switch 20. In particular, it includes a pair of conductors for generating power and control signals to a pneumatic element 44, which may be a solenoid valve operating pneumatic switches. Air under pressure conveyed via conduit 18 from air supply 16 may be channeled into conduit 46, which conduit actuates a plunger in a cylinder within housing 48. The actuated plunger will cause upward translation of electrode support 50 supporting movable jaw 14; this upward movement is depicted by arrowheads 52. Upon repositioning of the solenoid valve within pneumatic element 44 in response to control signals, a supply of air is directed into conduit 54 and conveyed to the cylinder within housing 48. The resulting air pressure acting upon the plunger will cause the plunger to translate in a reverse direction to lower electrode support 50, as depicted by arrowheads 56. As electrode 14 moves in concert with the electrode support, it will be brought into proximity with electrode 12. The control signals for movement of the electrode support, as described above, is a function of foot switch 20 acting through module 40. Commensurate with downward repositioning of electrode 14, the RF energy generated by the RF generator and transmitted through coaxial cable 32 is applied via conductor 60 to fixed jaw 12. As movable jaw 14 is grounded, as depicted, RF energy will be transmitted between the jaws. As described in further detail in U.S. Pat. Nos. 5,349,166 and 5,543,604, the impedance between jaws 12 and 14 may be sensed and conveyed to RF generator through coaxial cable 32 (as depicted in FIG. 1). The impedance is a function of the degree of mismatch in the circuitry and will affect the RF energy transmitted across the jaws and therefore the amount of heating being performed. A power supply 66 disposed within the RF generator may be utilized to provide the requisite electrical power for the various operations performed.

Figure 3A:
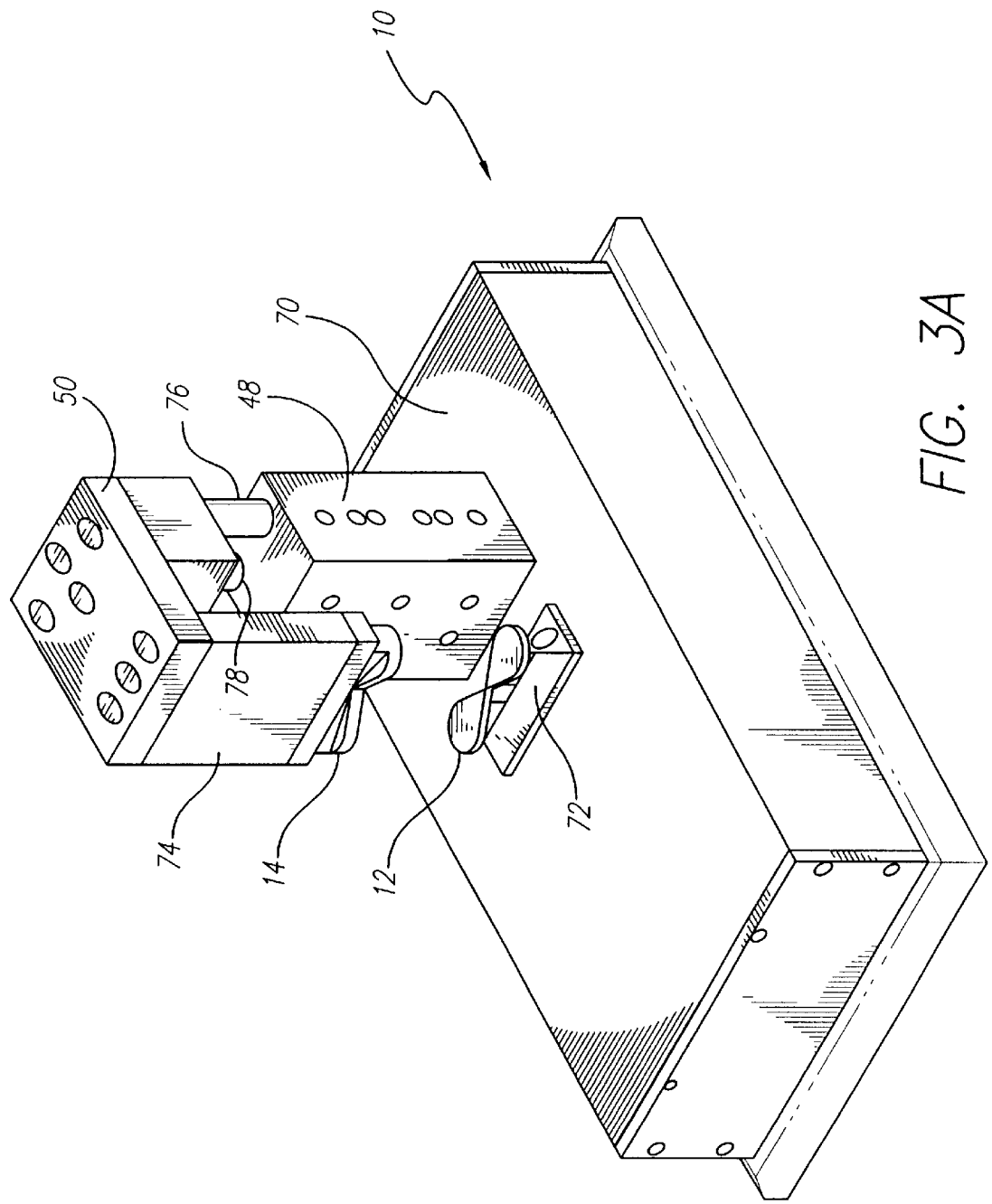
FIG. 3A illustrates the pneumatically operated jaws.

Referring to FIG. 3A, there is illustrated a detailed view of welding unit 10. The welding unit includes a platform 70 supporting an anvil 72 upon which jaw 12 is mounted in fixed relationship. Housing 48 extends upwardly from platform 70 to support supporting element 50 through a pair of translatable rods 76,78, which rods may be extensions of a solenoid plunger(s) or a pneumatically operated actuator mounted within the housing to effect selective vertical movement of the head. A mounting 74 extends downwardly from the supporting element and serves a base for jaw 14. Upon vertical movement of the supporting element, jaw 14 is brought into and out of proximity with jaw 12. As noted above, jaw 14 is grounded and jaw 12 is at a voltage potential above ground upon application of RF energy, as discussed above, and is electrically insulated from platform 70 by anvil 72 serving as an insulator.

Figure 3D:
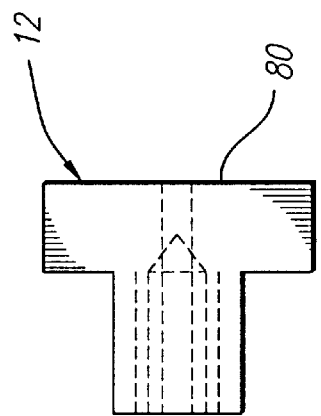
FIGS. 3B, 3C, and 3D illustrate three views of a typical jaw.
Figure 3C:
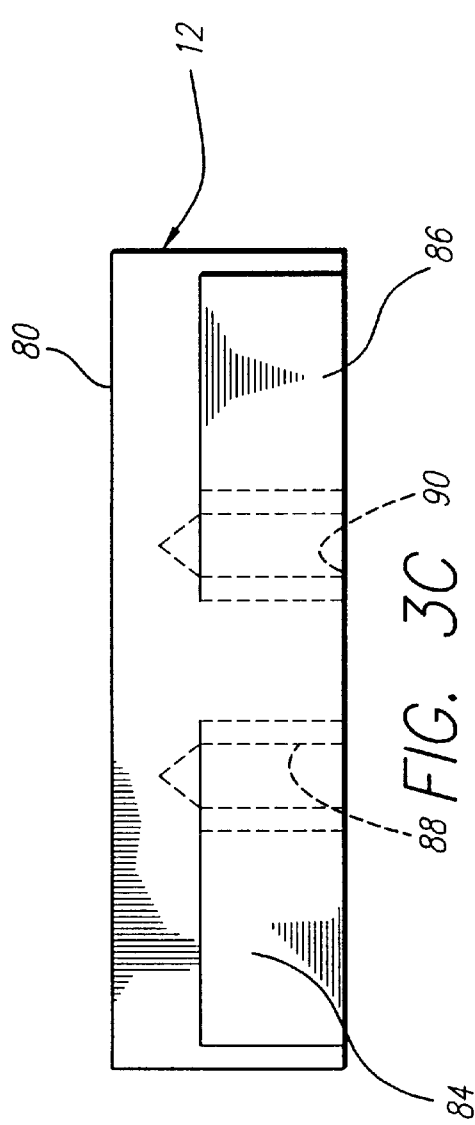
Figure 3B:
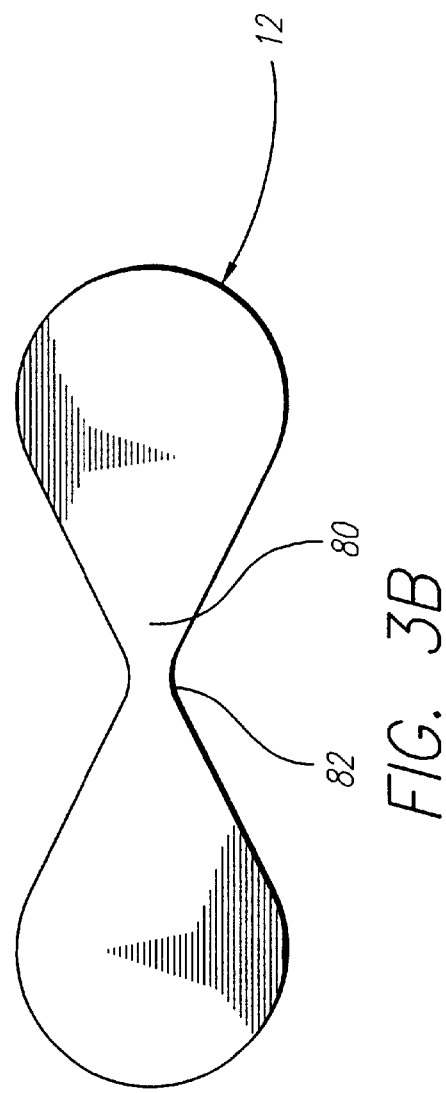

FIGS. 3B, 3C and 3D depict top, front, and side views, respectively, of jaw 12; as jaw 14 is identical with jaw 12, the following description applies to both jaws. Surface 80 of jaw 12 is planar and has an outline in the shape of an hourglass. That is, the center is necked down with portions extending in opposed directions and increasing in width and ultimately terminated by an arc of a circle. Variations of this outline are contemplated. For reasons which will be discussed below, it has been learned that the inclusion of a generally centrally located necked down section 82 tends to concentrate stresses at the necked down section of a similarly shaped membrane formed as an interconnection between two plastic containers in response to forces applied to the respective attached plastic containers. Thus, rupture of such a membrane will most often be initiated proximate the necked down section and thereafter extend laterally in opposed directions as a function of the disruptive forces applied.

In any operation involving the welding or melting of plastic, it is important to quickly dissipate any heat produced in the jaws or surfaces causing the welding or melting. For this reason, cavities 86 are formed in the underside of jaw 12 proximate the opposed lateral wide sections of the jaw. Not only does this reduce the amount of mass that may become heated, but the additional surface areas enhance heat dissipation. These cavities provide an additional function of permitting electrical tuning of the jaws to control or reduce the capacitance of the electrodes. Threaded cavities 88,90 are disposed within jaw 12 to receive machine screws for rigidly retaining the jaw in place. The screws also act as conductors to supply RF energy from matching circuitry 40 through anvil 72 and to jaw 12. A material particularly suitable for the jaws is brass as it is easily machineable, is unlikely to become corroded as a result of spillage of any liquid, and is relatively inexpensive. Other materials may include steel and/or electrically conducting ceramics.

Referring jointly to FIGS. 4A and 4B, there is shown a typical plastic container or bag 100 for use with the present invention. The bag is formed of two sheets of plastic material welded to one another with a perimeter weld 106 to form a seam 107 and a space 108 between the opposing walls 102,104. As particularly depicted in FIG. 4A, tubing 110 may have one end 112 inserted within the bag in sealed relationship to the bag; the techniques and procedures for doing so are well known to those skilled in the plastic bag art. A barrier or shield 114 is disposed within space 108. It may be of man-made material and must have a melt temperature above that of the material from which sheets 102,104 are made. A typical and suitable material for the shield is Polyimid film, sold under the trademark KAPTON. Non RF reactive materials may also be used, such as polypropylene, polyethylene or similar thermoplastics with an insert or shield of an RF reactive barrier material, such as polyvinylchloride (PVC), ethylene vinyl acetate (EVA) or other RF reactive thermoplastics, as the heating source for the non RF reactive materials and as the barrier or shield. Bag 120 depicted in FIGS. 5A and 5B is essentially the same as bag 100 and as the components are functionally the same, common reference numerals have been used. The main difference between bag 100 and bag 120 is that bag 120 is significantly longer with respect to its width than bag 100. This additional length permits bag 120 to be used in the manner of a manifold to which a plurality of smaller bags, such as bags 100, may be interconnected with a sterile connection.

FIG. 4C illustrates a typical orientation of two plastic bags of the type shown in FIGS. 4A and 4B which are to be interconnected through a sterile connection. Bag 100A is superimposed upon bag 100B with the longitudinal axes thereof generally aligned. Thereby, tubings 110A and 110B extend from their respective bag in the same or opposed directions and interference therebetween upon superimposition of the bags is avoided. Similarly, bags 120A and 120B, of the type illustrated in FIGS. 5A and 5B, are superimposed upon one another such that their respective longitudinal axes are generally aligned, as illustrated in FIG. 5C. Thereby, respective tubings 110A and 110B extend in opposed directions to avoid mutual interference and interference with the adjacent bag.

After a pair of bags, such as bags 100A and 100B, are placed adjacent one another in a superimposed relationship, the pair of bags are placed intermediate electrodes 12 and 14, as illustrated in FIG. 6A. Upon urging electrode 14 toward electrode 12, as depicted by arrows 122, bags 100A and 100B are squeezed therebetween. Simultaneously, RF energy is transmitted between the electrodes to heat the plastic bags and thereby sterilize the material of the walls of the plastic bags to about the melting temperature of the plastic. This will cause plastic sheet 104A of bag 100A and sheet 102B of bag 100B to soften or melt and become fused with one another. The RF energy transmitted alone and/or the temperature of such melting and fusion is sufficient to kill any bacteria, virus or other microorganisms that may be present on the surfaces of these sheets; thus, these surfaces become sterilized intermediate electrodes 12 and 14. Because of the heat applied, sheet 104A of bag 100A adjacent electrode 14 and sheet 102B adjacent electrode 12 will experience a temperature increase sufficient to melt the plastic material and the pressure of the jaws will cause migration of plastic material laterally from inbetween the electrodes. Because of the presence of liner or shield 114A intermediate sheets 102A and 104A, sheet 102A will not become fused with sheet 104A. Also, the presence of liner or shield 114B intermediate sheets 102B and 104B, will prevent fusion of these two sheets to one another. By carefully controlling the extent to which electrode 14 is brought toward electrode 12, as depicted by arrows 122, the quantity of material of each of the sheets displaced intermediate electrodes 12 and 14 is carefully controlled to leave a membrane of predetermined thickness of fused sheets 104A and 102B. Sheet 102A adjacent electrode 14 and sheet 104B adjacent electrode 12 will be somewhat heated due to the transmission of RF energy therethrough. However, as the jaws are not heated for purposes of melting the plastic, the jaws serve as heat sinks to draw heat from the adjacent plastic material, sheets 102A and 104B. Thus, these sheets will not experience the same raised temperature as sheets 102B and 104A. As discussed above, the shape of electrodes 12 and 14 is generally in the form of an hourglass. This shape produces membranes in the respective sheets which have an hourglass outline 124, as depicted in FIG. 6B.

While FIG. 7A looks very much like FIG. 6B, it is intended to represent a top view of a pair of bags 100A and 100B after the bags have been interconnected with one another along seal 132 defining outline 124. FIG. 7B illustrates a representative cross-section of the bags shown in FIG. 7A. After the bags have become fused with one another and RF energy is no longer transmitted intermediate electrodes 12,14, electrode 14 is raised, as depicted by arrows 126, after a period of time to permit the plastic to cool and thereafter to permit withdrawal of interconnected bags 100A and 100B. With the bags somewhat laterally expanded, as illustrated in FIG. 7B, the change in configuration of the respective sheets forming the two bags are readily apparent. Sheet 104A of bag 100A and sheet 102B of bag 100B have been fused together to produce a membrane 130 having an outline 124 as depicted in FIGS. 6B and 7A. During the act of fusing sheets 104A and 102B, the material expelled as a result of the compressive force imposed by the clamping action of electrodes 12 and 14 produces a seal 132 extending about membrane 130. This seal is of a thickness greater than the sheets of the bags extending therefrom and provides sufficient robustness and strength to prevent tearing apart the sheets of the respective bags. As noted above, the heating resulting from transmission of RF energy may cause some melting of sheets 102A and 104B to produce membranes 134,136 therein. The reduced heating and melting, if any, of sheets 102A and 104B will result in minimal material migration, if any, to produce membranes 134 and 136. For this reason, the structural strength of sheets 102A and 104B is affected to a degree insufficient to compromise the integrity of the respective bags during normal operation and handling.

Referring to FIG. 8, there is shown a typical application of the present invention. In the field of medicine, health care, biotechnology, and other disciplines wherein fluids must be mixed, a sterile connection to bring about such mixing is often mandatory. For such applications, the present invention is particularly useful. Furthermore, if fluid must be conveyed from one vessel to another, such conveyance can be made through a sterile connection if the present invention is employed. As shown in FIG. 8, a vessel 140, containing a fluid 142, includes tubing 144 terminated in a bag 146, which bag may be like bag 100 shown in FIGS. 4A,4B. Similarly, a vessel 150 containing a fluid 152 includes tubing 154 terminated in a bag 156 of the type shown in FIGS. 4A,4B. These two bags may be joined with one another through a rupturable membrane, as depicted and described with respect to FIGS. 7A and 7B.

FIGS. 9A and 9B illustrate a typical application for the elongated bag illustrated in FIGS. 5A,5B. A pair of such elongated bags 120A,120B are adapted to embody a plurality of rupturable membranes of the type described above to provide a high flow rate sterile interconnection between bags 120A and 120B. Each of these membranes may be formed, as described above, by repetitive repositioning of the superimposed bags between electrodes 12 and 14 (see FIG. 7B). Or, a plurality of pairs of electrodes 12A and 14A, 12B and 14B, 12C and 14C, as depicted, may be used. Each of these pairs of electrodes may simultaneously clamp the bag, as shown in FIG. 6A and thereafter release the bag after formation of membranes 160, 162 and 164, as represented by arrows 166. Alternatively, the pairs of electrodes may sequentially clamp, form a membrane, and release the pair of bags. Each of the membranes would have formed thereabout a relatively thick seal 168, 170, and 172, as described above. Necessarily, each of bags 120A,120B would include liners or shields 114A,114B, respectively, as described above.

Figure 10:
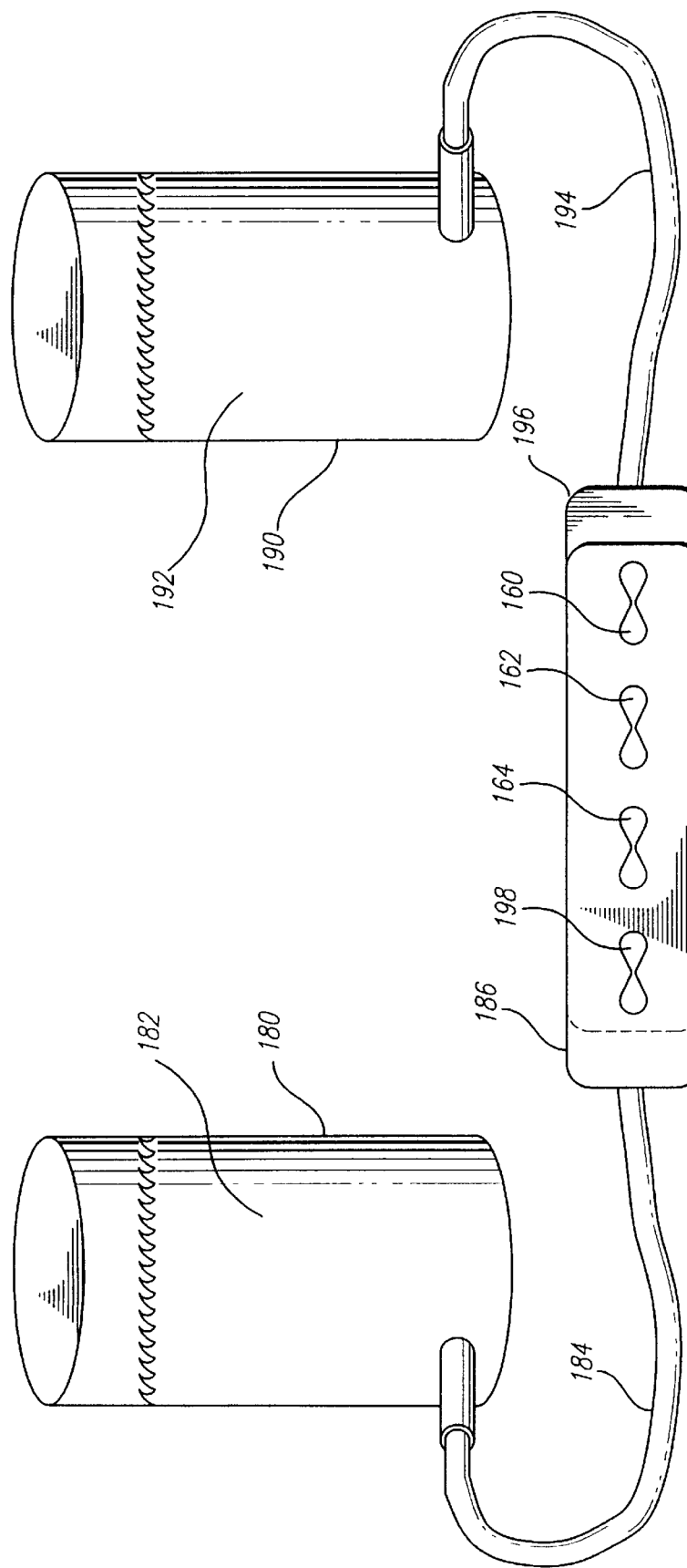
FIG. 10 illustrates a typical application for the interconnections illustrated in FIGS. 9A and 9B wherethrough a high flow rate is desired.

FIG. 10 illustrates a typical application of a sterile interconnection of the type shown in FIGS. 9A and 9B. Herein, a vessel 180, containing a fluid 182, includes tubing 184 in fluid communication with bag 186. Similarly, a vessel 190 containing a fluid 192 includes tubing 194 in fluid communication with a bag 196. By forming a plurality of rupturable membranes 160, 162, 164, and 198 intermediate bags 186, 196, a high flow rate between vessels 182,192 can be accomplished to produce the required mixing or transfer of fluid.

Figure 11:
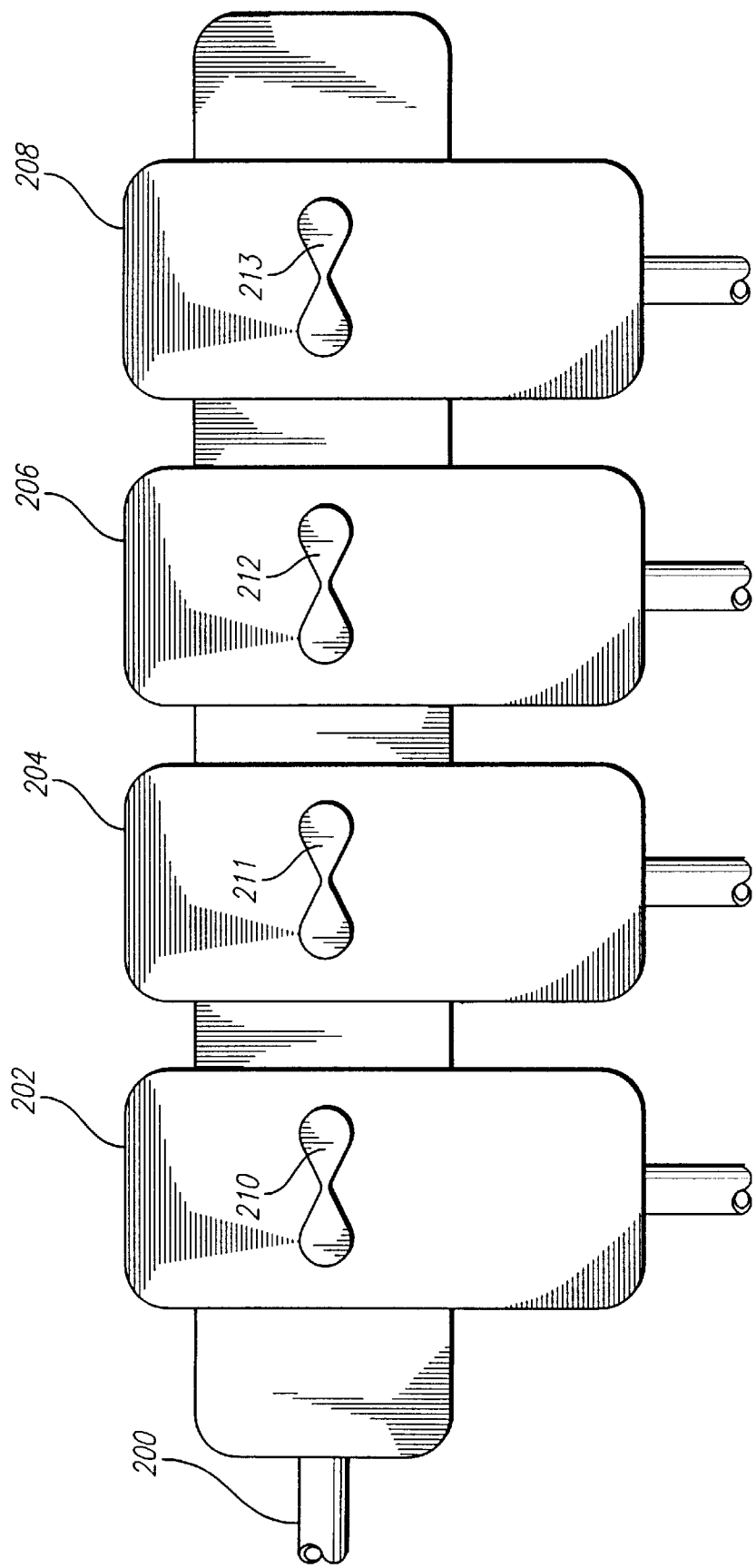
FIG. 11 illustrates an interconnection between a first container serving as a manifold and a plurality of second containers connected to the first container.
Figure 12:
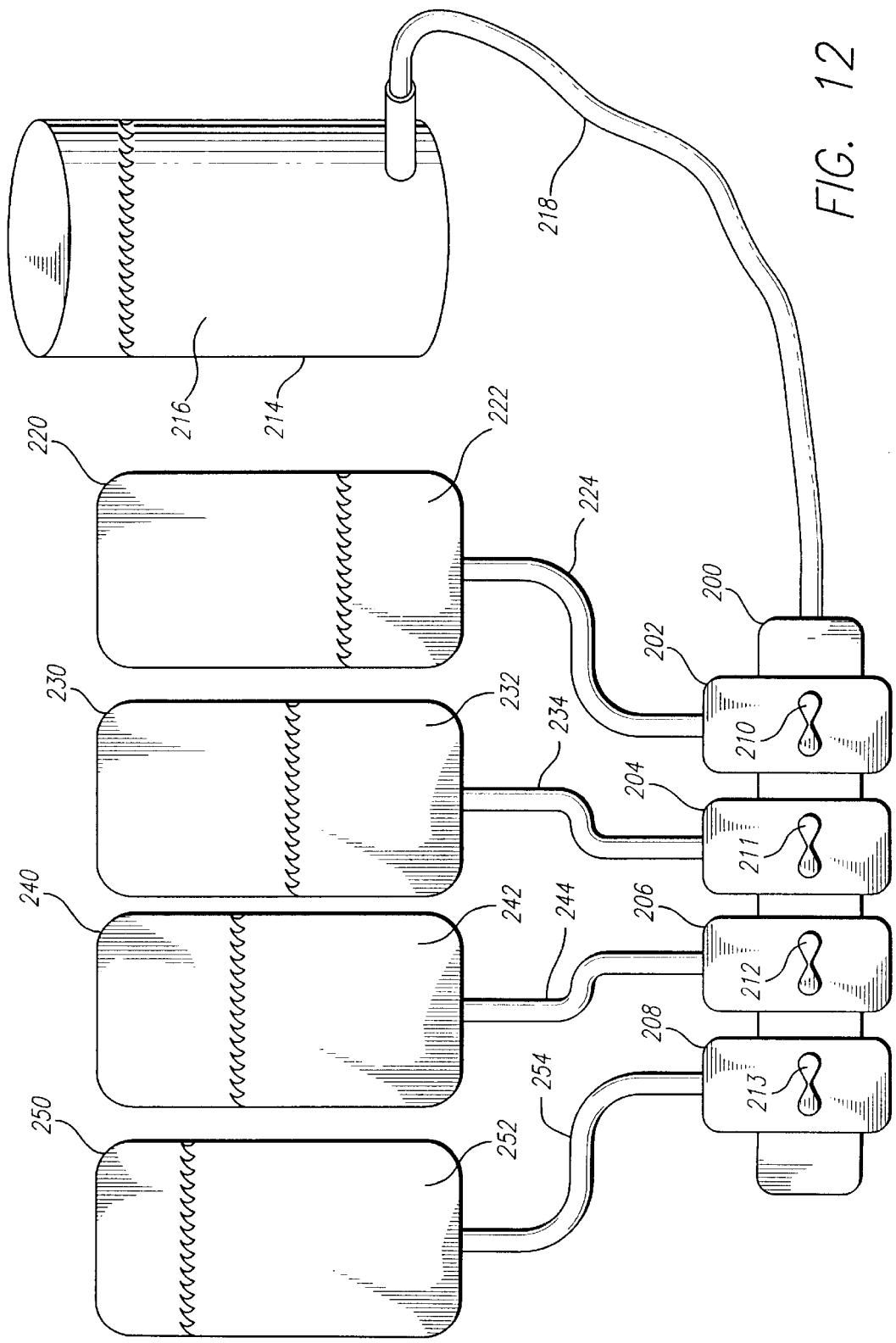
FIG. 12 illustrates a typical application of the interconnected containers illustrated in FIG. 11.

FIG. 11 illustrates a further sterile interconnection variant wherein an elongated bag 200 is interconnected with each of a plurality of smaller bags 202, 204, 206, and 208, through rupturable membranes 210, 211, 212, and 213, respectively. Each of these bags include respective tubing to accommodate fluid flow into and out of the bags. A typical application is shown in FIG. 12. A vessel 214, housing a fluid 216, is in fluid communication with bag 200 through tubing 218. Vessel 220 houses fluid 222 and is in fluid communication with bag 202 via tubing 224. Vessel 230 houses fluid 232 and is in fluid communication with bag 204 via tubing 234. Vessel 240 houses fluid 242 and is in fluid communication with bag 206 via tubing 244. Vessel 250 houses fluid 252 and is in fluid communication with bag 208 via tubing 254. Each of bags 202, 204, 206, and 208 is in fluid communication with bag 200 through a sterile interconnection represented by membranes 210, 211, 212, and 213, respectively. Upon rupture of one or more of these membranes on a selective basis, fluid from any of the vessels can be mixed with the fluid in one or more of the remaining vessels. Alternatively, fluid from one vessel can be channeled into one or more of another of the vessels. Because each of the membranes is selectively rupturable, the sequencing of any mixing or transport of fluid can be in a predetermined order and direction. As each of the interconnections between the bags is a sterile interconnection, intrusion of bacteria, viruses, or other microorganisms is precluded.

Figure 13:
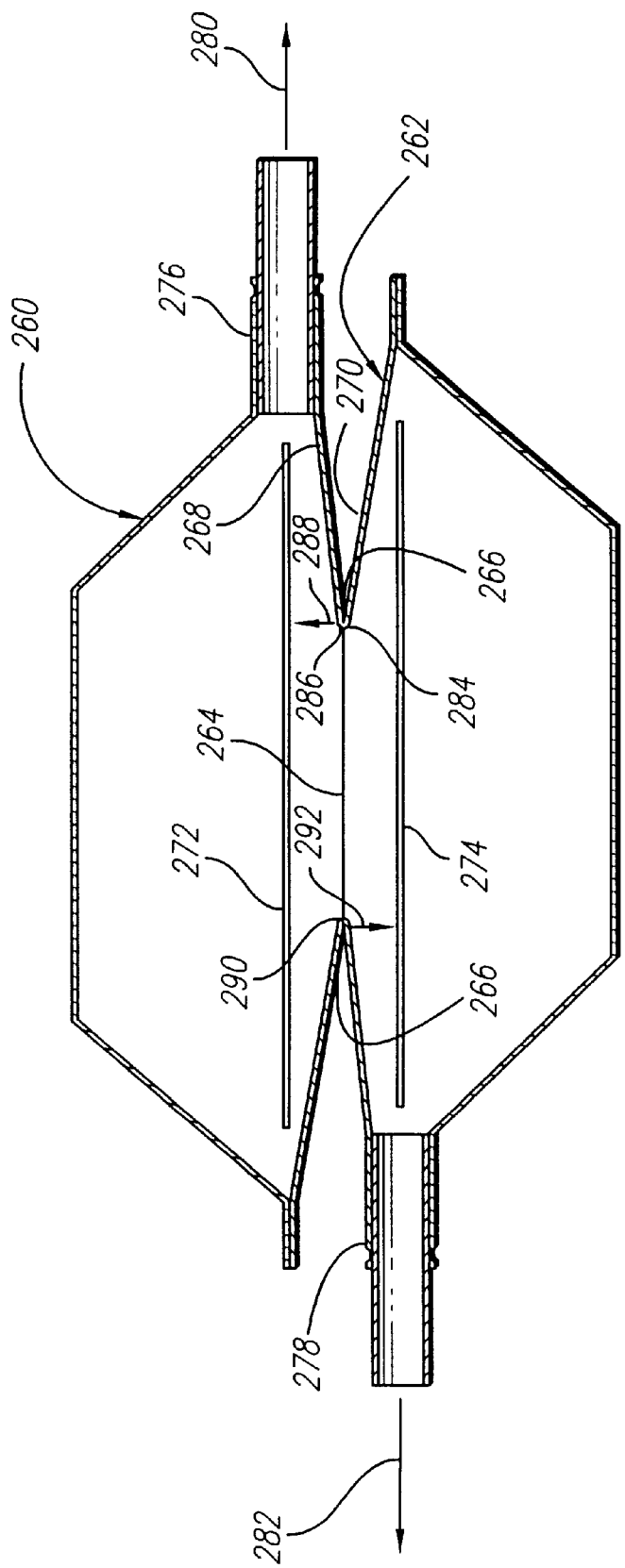
FIG. 13 illustrates a typical method for deliberately rupturing the membrane interconnecting the interior of two bags to establish fluid flow therebetween.

Referring to FIG. 13, there is illustrated a representative cross-section of bags joined to one another through a sterile interconnection represented by a membrane 264. As discussed above, a seal 266 extends about the membrane to add structural rigidity to sheets 268 and 270 forming a part of bags 260,262, respectively. Liners or shields 272,274 are disposed within each of bags 260,262 for reasons set forth above. By manually grabbing seam 276 of bag 260 and seam 278 of bag 262 and pulling in opposed directions, as depicted by arrows 280,282, stresses will be imposed upon membrane 264. As described above, the stresses will be concentrated at necked section 284 of membrane 264. In particular, the stresses present at necked section 284 resulting from the manual forces applied tend to lift edge 286 of necked section 284 as depicted by arrow 288 and draw down edge 290 of necked section 284, as depicted by arrow 292. This will result in a tearing of the necked section of membrane 264 and such tearing will continue in opposed directions within the membrane, as described above. As a result, fluid communication between bags 260 and 262 will now be present.

While it is possible to configure the travel of jaws 12 and 14 to cause evacuation of plastic material from the adjacent walls of the bags and between the jaws and thereby fail to produce the membrane discussed above, this procedure is not preferred for the following reasons. First, there is a possibility of a resulting leak if the strength of any membrane formed in the externally exposed walls of the bags is materially reduced. Second, fluid communication between the bags will immediately occur which may not be desired.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. Apparatus for forming a sterile rupturable membrane interconnecting two plastic units placed adjacent one another with material of a wall of one unit in contact with material of a wall of the other unit, said apparatus comprising in combination:
   (a) a pair of jaws having surfaces for clamping the plastic units therebetween to place the wall of one unit adjacent the wall of the other unit;
   (b) a source of RF energy transmitted across said pair of jaws for heating the clamped units as a function of the impedance of the clamped units to sterilize by heating at least the surfaces of the walls of the units adjacent one another and to fuse the material of the wall of one unit with the material of the adjacent wall of the other unit;
   (c) means for retaining fused material of the walls of the one and the other units intermediate said pair of jaws to form the sterile rupturable membrane between the one and the other units; and
   (d) a shield disposed in each unit to prevent fusing the walls of each unit to one another.

2. The apparatus as set forth in claim 1 including actuating elements for urging said jaws toward and away from one another on command.

3. The apparatus as set forth in claim 2 wherein said actuating elements include a pneumatically operated actuator and a switch for producing the command.

4. The apparatus as set forth in claim 1 wherein one jaw of said pair of jaws is stationary and wherein the other jaw of said pair of jaws is movable toward and away from said one jaw.

5. The apparatus as set forth in claim 4 wherein the surfaces of said pair of jaws in contact with the plastic units are flat.

6. The apparatus as set forth in claim 5 wherein each surface of said pair of jaws has an hourglass outline to define the rupturable membrane with an hour class shape.

7. The apparatus as set forth in claim 1 wherein each plastic unit is a container having said shield disposed therein.

8. The apparatus as set forth in claim 1 wherein the rupturable membrane is formed in the shape of the surfaces of said pair of jaws.

9. The apparatus as set forth in claim 8 wherein the fused walls include a seal formed of melted plastic material of each plastic unit and extending about the membrane.

10. The apparatus as set forth in claim 1 including means for dissipating heat transferred by conduction from the clamped units to each jaw of said pair of jaws at least during transmission of the RF energy.

11. The apparatus as set forth in claim 1 wherein the material of the walls of the units are of non RF reactive plastic material and wherein said shield is of RF reactive plastic material to heat by conduction the walls of the units upon transmission of RF energy from said source.

12. The apparatus as set forth in claim 11 wherein the rupturable membrane is formed in the shape of the surfaces of said pair of jaws.

13. The apparatus as set forth in claim 12 wherein the fused walls include a seal formed of melted plastic material of each plastic unit and extending about the rupturable membrane.

14. A sterile interconnection between plastic units having opposed walls formed by a process comprising the steps of:
   (a) compressing the plastic units between the surfaces of a pair of jaws to locate the wall of one plastic unit adjacent the wall of another plastic unit;
   (b) applying RF energy between the pair of jaws to heat and thereby sterilize the adjacent walls of the plastic units;
   (c) further applying RF energy between the pair of jaws as a function of the impedance between the pair of jaws to fuse the adjacent plastic walls of the plastic units with one another;
   (d) moving the pair of jaws toward one another to form a rupturable membrane from and common to the adjacent walls and the plastic units; and interconnecting
   (e) shielding the opposed walls of each plastic unit from becoming fused with one another.

15. The process as set forth in claim 14 including the step of forming the rupturable membrane in an hourglass shape to control the location of rupture of the rupturable membrane upon a subsequently applied force to the plastic units to rupture the rupturable membrane.

16. The process as set forth in claim 14 including the step of developing a seal about the perimeter of the rupturable membrane by combining plastic from the walls of the plastic units being fused together.

17. The process as set forth in claim 14 including the step of dissipating heat transferred by conduction from the compressed plastic units to each jaw of the pair of jaws at least during the application of the RF energy.

18. The process as set forth in claim 14 wherein the walls of the plastic units are of non RF reactive plastic material and including a shield of RF reactive plastic material disposed in each unit and wherein said steps of applying and further applying comprise heating of each of the shields to heat by conduction the walls of the units.

19. The process as set forth in claim 18 including the step of forming the rupturable membrane in an hourglass shape to control the location of rupture of the rupturable membrane by a subsequently applied force to the plastic units to rupture the rupturable membrane.

20. The process as set forth in claim 19 including the step of developing a seal about the perimeter of the membrane by combining plastic from the walls of the rupturable plastic units being fused together.

21. A method for making a sterile connection between adjacent walls of a pair of plastic units with a rupturable membrane, said method comprising the steps of:
   (a) compressing a section of each of the units between a pair of jaws;
   (b) heating the compressed sections of the plastic units to about the melting temperature of the plastic of the plastic units to sterilize the walls of the plastic units, said step of heating including the step of transmitting RF energy between the pair of jaws at a power level which is a function of the impedance across the pair of jaws;
   (c) forming the rupturable membrane of plastic fused from the plastic of the compressed sections of the plastic units intermediate the jaws;
   (d) developing a seal of plastic melted from the plastic of the compressed sections of the plastic units intermediate the jaws and extending about the perimeter of the rupturable membrane; and
   (e) displacing the jaws from one another to permit removal of the interconnected plastic units.

22. The method as set forth in claim 21 wherein the jaws are hourglass shaped and wherein said step of forming includes the step of forming the rupturable membrane with an hourglass shaped outline.

23. The method as set forth in claim 21 including the step of reducing transmission of RF energy across the jaws as a function of the impedance across the jaws.

24. The method as set forth in claim 21 wherein said step of compressing includes the step of applying a pneumatic force to at least one of the jaws.

25. The method as set forth in claim 21 including the step of dissipating heat transferred by conduction from the compressed sections of the plastic units to each jaw of the pair of jaws at least during said step of heating.

26. The method as set forth in claim 21 wherein the walls of the plastic units are of non RF reactive plastic material and including a shield of RF reactive plastic material disposed in each unit and wherein said step of heating comprises heating of each of the shields to heat by conduction the walls of the units.

27. The method as set forth in claim 26 wherein the jaws are hourglass shaped and wherein said step of forming includes the step of forming the rupturable membrane with an hourglass shaped outline.

28. The method as set forth in claim 26 including the step of reducing transmission of RF energy across the jaws as a function of the impedance across the jaws.

29. A method for interconnecting the walls of plastic units placed adjacent one another with a sterile connection having a membrane rupturable in a predetermined configuration, said method comprising the steps of:

(a) clamping the plastic units between a pair of jaws;

(b) heating the plastic walls adjacent one another of the clamped plastic units to a temperature of about the melting temperature of the plastic walls to cause mixing and lateral migration of the heated plastic in response to the pressure applied to the plastic units upon exercise of said clamping step, said heating step including the step of sterilizing the surfaces of the adjacent plastic walls;

(c) limiting movement of the jaws toward one another to permit formation of the membrane of mixed plastic from the adjacent walls intermediate the jaws; and (d) forming the membrane into a shape that produces a predetermined concentration of stresses in the membrane upon application of forces to the interconnected plastic units to focus the stresses at a location that will cause initial rupture of the membrane.

30. The method as set forth in claim 29 wherein said step of forming includes the step of forming the membrane in an hourglass shape having a necked section defining the location of the concentration of stresses and the location of the initial rupture.

31. The method as set forth in claim 29 wherein said step of heating includes the step of transmitting RF energy across the jaws at a power level controlled by the impedance of the clamped plastic units.

32. The method as set forth in claim 29 wherein said step of clamping includes a pneumatically operated plunger for repositioning at least one of the jaws.

33. The method as set forth in claim 29 including the step of dissipating heat transferred by conduction from the clamped plastic units to each jaw of the pair of jaws at least during said step of heating.

34. The method as set forth in claim 29 wherein the walls of the plastic units are of non RF reactive plastic material and including a shield of RF reactive plastic material disposed in each unit and wherein said step of heating comprises heating of each of the shields to heat by conduction the walls of the units.

35. The method as set forth in claim 34 wherein said step of forming the membrane in includes the step of forming an hourglass shape having a necked section defining the location of the concentration of stresses and the location of the initial rupture.

36. The method as set forth in claim 34 wherein said step of heating includes the step of transmitting RF energy across the jaws at a power level controlled by the impedance of the clamped plastic units.

37. Apparatus for interconnecting a pair of plastic bags by fusing the material of the wall of one bag with the material of the adjacent wall of the other bag with a sterile rupturable membrane to permit non-contaminated fluid flow therebetween upon rupture of the rupturable membrane, said apparatus comprising in combination:

(a) a pair of jaws for clamping sections of the bags therebetween;

(b) a source of RF energy;

(c) control means for transmitting RF energy from said RF energy source across said pair of jaws to heat the one wall and the other wall of the clamped sections of said pair of bags and thereby sterilize the one and the other walls of the clamped sections;

(d) further control means for controlling the power level of the RF energy as a function of the impedance across said pair of jaws to fuse the material of the one wall with the material of the other walls; and (e) means for retaining the fused material of the walls of the one and the other bags intermediate said pair of jaws to form the rupturable membrane between the one and the other bags.

38. The apparatus as set forth in claim 37 wherein each bag of said pair of bags includes a shield for preventing fusing of the walls of each bag of said pair of bags to one another.

39. The apparatus as set forth in claim 37 wherein each jaw of said pair of jaws is in the shape of an hourglass.

40. The apparatus as set forth in claim 39 wherein the rupturable membrane is formed in the shape of an hourglass.

41. The apparatus as set forth in claim 37 wherein each jaw of said pair of jaws includes at least one cavity having a surrounding skirt for dissipating heat transferred by conduction to the pair of jaws from the bags.

42. The apparatus as set forth in claim 37 wherein the one and the other of the walls are of non RF reactive plastic material and including a shield of RF reactive plastic material heated in response to transmission of RF energy across said pair of jaws for heating the one and the other walls by conduction.

43. The apparatus as set forth in claim 42 wherein membrane is formed in the shape of an hourglass.

* * * * *